(12) United States Patent
Mishra et al.

(10) Patent No.: US 11,461,372 B1
(45) Date of Patent: *Oct. 4, 2022

(54) DATA CLUSTERING IN LOGIC DEVICES USING UNSUPERVISED LEARNING

(71) Applicant: BAE Systems Information and Electronic Systems Integration Inc., Nashua, NH (US)

(72) Inventors: Sandeep Mishra, Manchester, NH (US); James C. Bode, Amherst, NH (US); Michael C. Caron, Merrimack, NH (US); Thomas A. Folsom, Bow, NH (US); Michael A. Zalucki, Hollis, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/205,161

(22) Filed: Mar. 18, 2021

(51) Int. Cl.
*G06F 16/28* (2019.01)

(52) U.S. Cl.
CPC .................... *G06F 16/285* (2019.01)

(58) Field of Classification Search
None
See application file for complete search history.

(56) References Cited

U.S. PATENT DOCUMENTS

| | | | |
|---|---|---|---|
| 7,353,218 B2 | 4/2008 | Aggarwal et al. | |
| 7,366,705 B2 * | 4/2008 | Zeng | G06F 16/355 706/20 |
| 7,720,848 B2 | 5/2010 | Guerraz et al. | |
| 9,280,386 B1 * | 3/2016 | Hagmann | G06F 9/5038 |
| 10,366,111 B1 * | 7/2019 | Florissi | G06F 16/951 |
| 10,691,728 B1 * | 6/2020 | Masson | H04L 41/22 |
| 2003/0069873 A1 * | 4/2003 | Fox | G06F 16/338 |
| 2006/0047655 A1 | 3/2006 | Peter | |
| 2014/0129560 A1 * | 5/2014 | Grokop | G06F 16/285 707/737 |
| 2014/0149412 A1 * | 5/2014 | Nakamura | G06F 16/355 707/737 |
| 2017/0132307 A1 * | 5/2017 | Xiao | G06F 16/285 |
| 2020/0226490 A1 * | 7/2020 | Abdulaal | G06N 20/00 |

FOREIGN PATENT DOCUMENTS

CN 106934417 A 7/2017

* cited by examiner

*Primary Examiner* — Robert W Beausoliel, Jr.
*Assistant Examiner* — Cheryl M Shechtman
(74) *Attorney, Agent, or Firm* — Finch & Maloney PLLC; Gary McFaline (57) ABSTRACT

A data clustering device includes an input configured to receive a plurality of data points encoded in at least one signal and a hardware logic circuit configured to extract one or more features of the one or more data points from the at least one signal, create or update, based on the one or more features, one or more data clusters representing one or more of the data points, and encode at least one of the one or more data clusters in at least one output signal. The device further includes an output configured to provide the at least one output signal, for instance, to a processor, such as a processor for controlling a controlled system. The device can be further configured to split or merge the data cluster(s) based on a statistical distribution of the one or more data points in the respective data cluster.

16 Claims, 10 Drawing Sheets

DATA CLUSTERING IN LOGIC DEVICES USING UNSUPERVISED LEARNING

STATEMENT OF GOVERNMENT INTEREST

This invention was made with United States government support. The United States government has certain rights in the invention.

FIELD OF THE DISCLOSURE

This disclosure relates generally to for data clustering, and in particular, techniques for data clustering in real time or near real time using logic devices configured with unsupervised learning techniques.

BACKGROUND

Clustering, or classification, is the task of grouping data, and more particularly complex objects or features represented by data, in such a way that the data in the same group, also referred to as a cluster, are more similar to each other than to data in other clusters. Clustering has many applications including pattern recognition, image analysis, data compression, and information retrieval, and are especially useful in system command and control applications for organizing large amounts of data representing complex objects or features. A wide variety of clustering techniques are known, but such techniques have a number of limitations. For example, many existing clustering techniques are resource intensive in that they require a great amount of computing power and/or processing time, depending on the size of the data set and the number of resulting clusters. Such techniques thus require costly resources and are not well-suited for real time data processing. For example, in some control applications there is a need to process large amounts of input data very rapidly to maintain tight and time-sensitive feedback, which is not possible in conventional software implementations. Therefore, non-trivial issues remain with respect to organizing large amounts of data in real time or in near-real time.

DETAILED DESCRIPTION

Data clustering techniques in logic devices are disclosed. In one example embodiment, a data clustering device includes an input configured to receive a plurality of data points encoded in at least one signal and a hardware logic circuit, such as a field programmable gate array (FPGA) or an application-specific integrated circuit (ASIC), configured to extract one or more features of the one or more data points from the at least one signal. The hardware logic circuit is further configured to create or update, based on the one or more features, one or more data clusters representing one or more of the data points, and encode at least one of the one or more data clusters in at least one output signal. The hardware logic circuit further includes an output configured to provide the at least one output signal to a processor, such as a processor for controlling a controlled system (e.g., a vehicle, a vessel, an aircraft, a munition, etc.). In some examples, the hardware logic circuit is further configured to split or merge the one or more data clusters based on a statistical distribution of the one or more data points in the respective data cluster. These tasks can be performed in real time or in near-real time, and in parallel with no or little prior information about the data points in the input signal.

General Overview

As noted above, although many data clustering techniques have been developed, each of them have limitations. For example, organizing a large, continuous set of data into clusters based on common characteristics without prior knowledge of the data, the size of the clusters, or how many clusters are in the data set is very difficult to achieve in a computationally efficient manner and in real time using existing techniques. In some applications, cluster analysis can be used to separate a stream of distinct incoming signals from sensors into multiple groups of signals. For such clustering to be useful in these applications, it should occur in real-time or in as close to real-time as practicable to avoid data obsolescence. However, is it difficult to achieve real-time clustering on a continuous stream of data with existing techniques, particularly when there is little or no prior knowledge about the features of the incoming data. Rather, most existing cluster analysis processes are heavily calibrated to perform well for a particular class of signals (e.g., k-means clustering) when the underlying signal characteristics are known in advance. Furthermore, existing data agnostic cluster analysis processes provide sub-optimal performance and/or are too slow for specific applications that cannot tolerate data losses or high latency.

Figure 2:
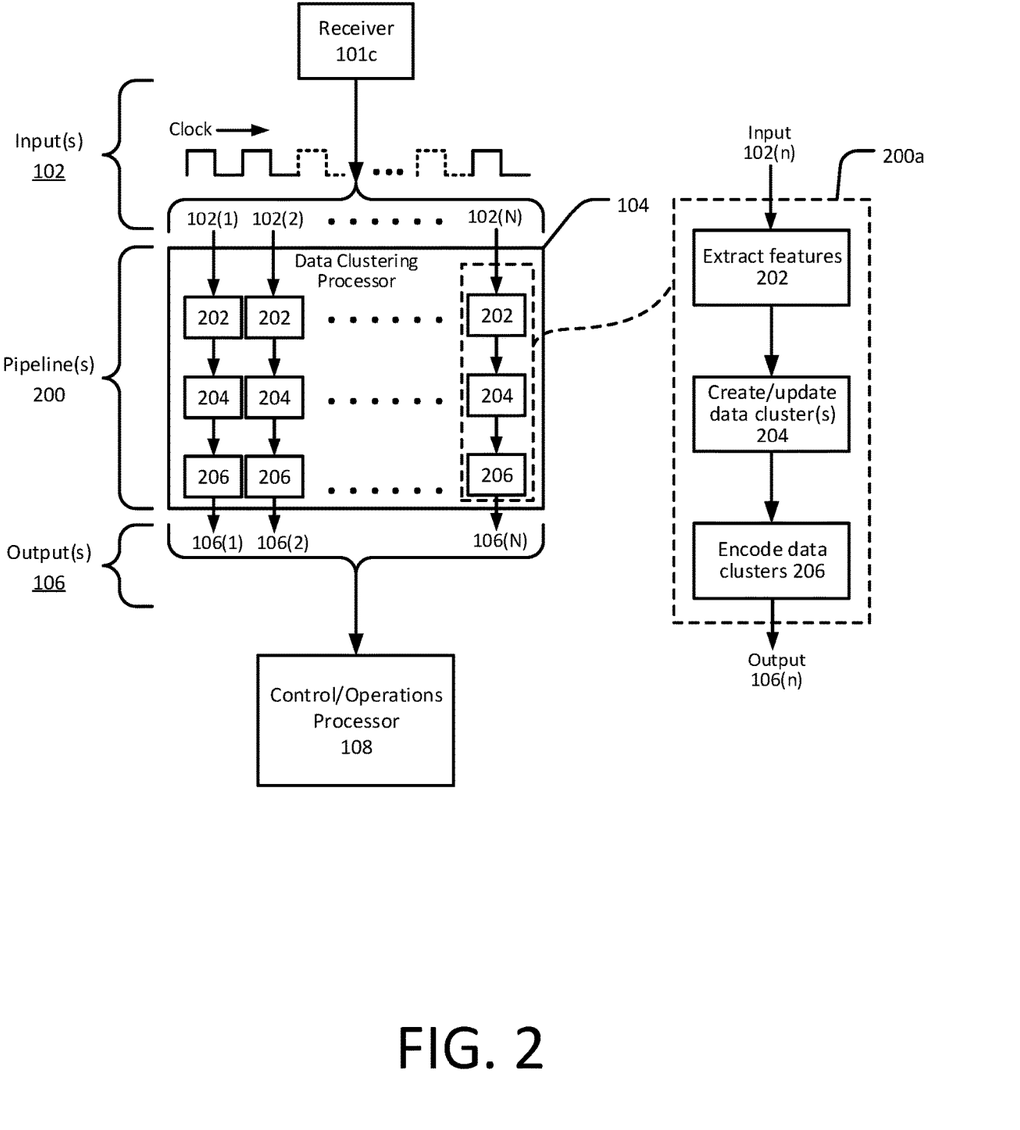
FIG. 2 is an example data clustering processor of the data clustering system of FIG. 1 for clustering data in real time or in near-real time, in accordance with an embodiment of the present disclosure.
Figure 6:
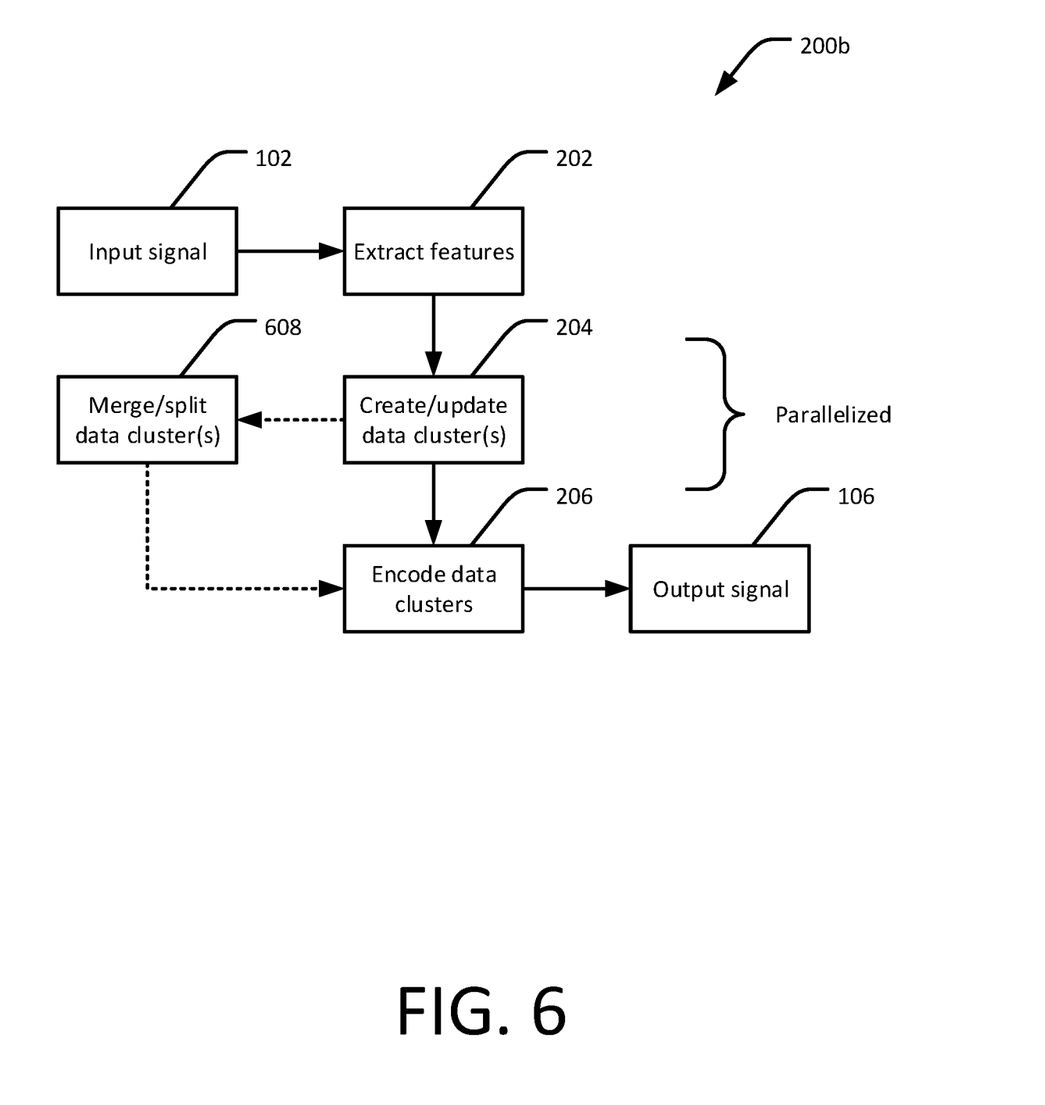
FIG. 6 is a flow diagram of an example data clustering processor logic pipeline for clustering data, in accordance with an embodiment of the present disclosure.
Figure 7A:
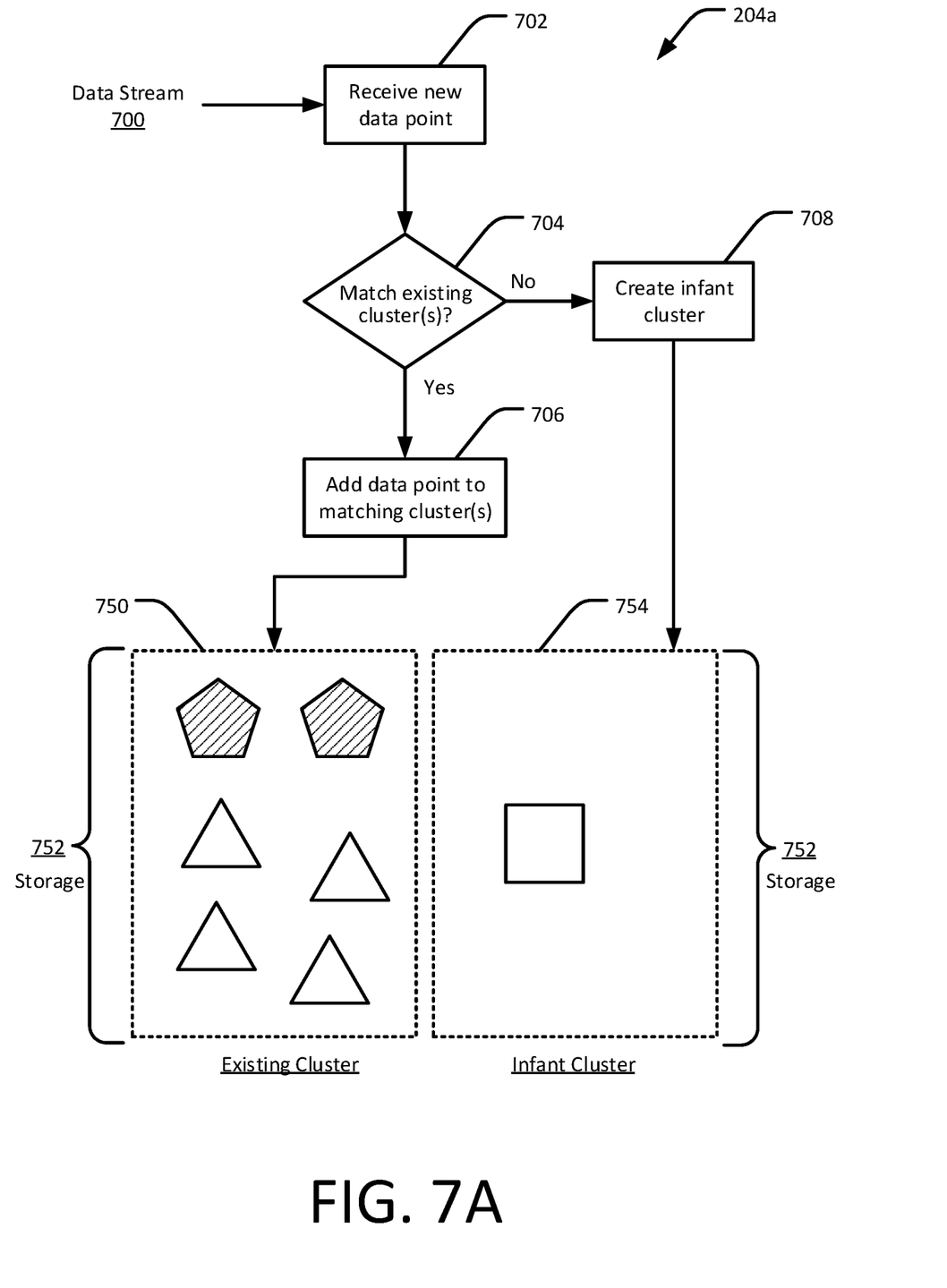
FIGS. 7A-B are flow diagrams of example data clustering processor logic pipelines for creating and updating data clusters, and spitting and merging data clusters, respectively, in accordance with an embodiment of the present disclosure.
Figure 7B:
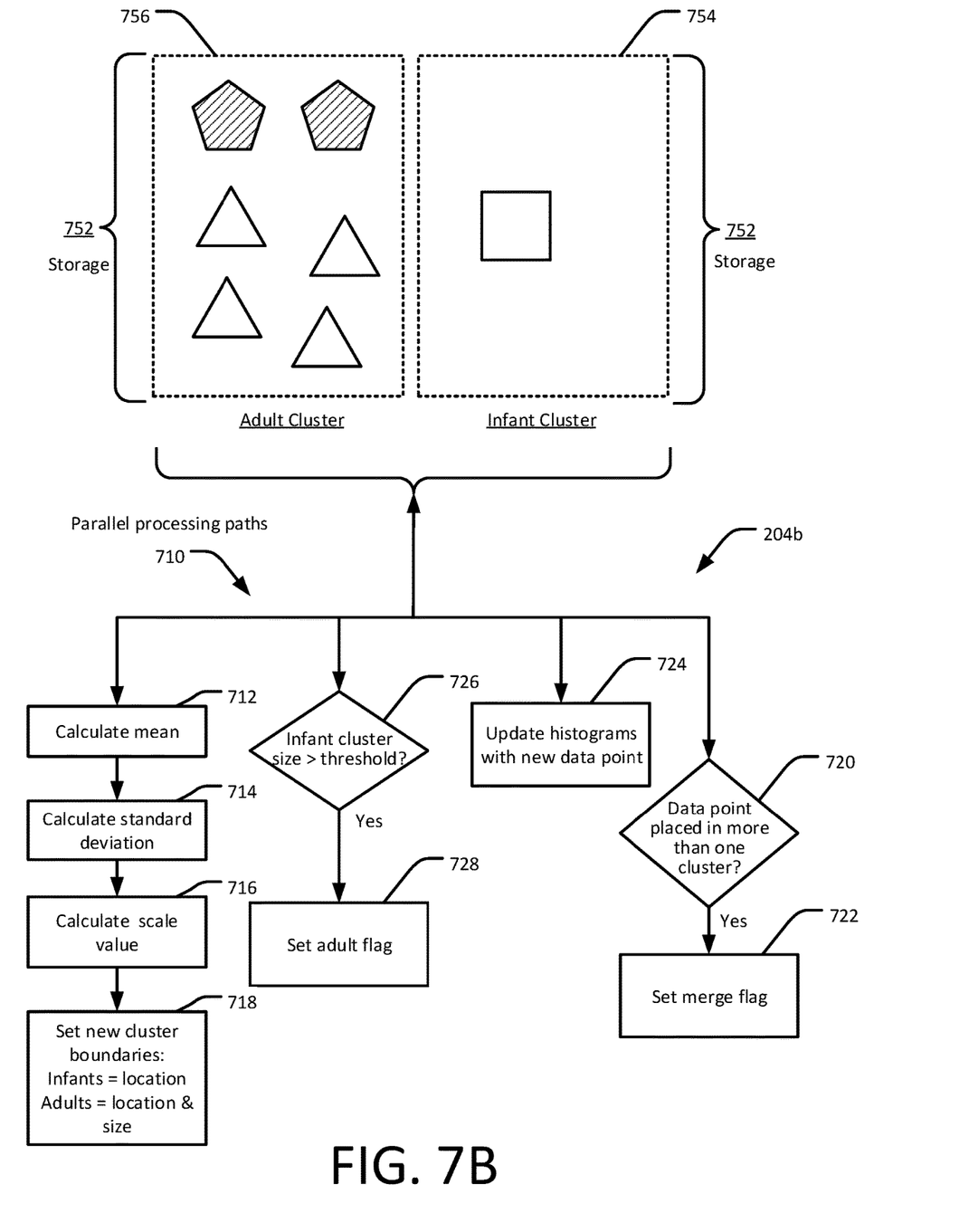

To this end, logic devices configured with unsupervised learning data clustering techniques are disclosed, such as shown in FIGS. 2, 6 and 7. The disclosed techniques utilize the raw input signal data to create and update data clusters. The clustering techniques are highly effective when no prior information about the underlying data is known; however, any available prior information, as well as learned information, about the underlying data can also be utilized to improve performance. As implemented in a logic device configured to process these signals, the disclosed techniques are generally referred to as "data stream clustering." The clustering techniques are unsupervised in that they learn patterns from unlabeled data and use the learned patterns to organize the data according to its commonalities and, in some cases, to discard data points that do not fit (or form) any learned pattern. In some embodiments, the disclosed data clustering techniques are implemented, at least in part, in firmware of a programmable or otherwise configurable logic device to parallelize the clustering, which is not possible using software implementations.

In accordance with an embodiment of the present disclosure, a field-programmable gate array (FPGA) is configured to parallelize data cluster creation and maintenance, including updating, merging, and splitting existing clusters. It will be understood that other processing devices can be used, such as an ASIC, a programmable logic device (PLD), an integrated circuit (IC), or other device configured to perform digital logic or other types of signal processing. For FPGA implementations, the processing of each cluster is implemented separately and encoded in a High-Speed Integrated Circuit Hardware Description Language (HDL) with pipelined calculations. For ASIC implementations, the HDL portions of the FPGA can be directly implemented in the hardware logic circuit. In any case, the pipeline clusters a continuous stream of data. The FPGA reads the data stream and outputs the resulting clusters. The FPGA further maintains or otherwise updates the clusters as new data is received and makes decisions about splitting, merging, deleting, and scoring clusters to enhance processing efficiency and manage memory utilization.

The clustering techniques provided here have a number of applications but are particularly useful in scenarios where very little to no prior information about the input data is known in advance, including information about the number of clusters present, the locations of the clusters, the size of the clusters, and the statistical distributions of the data in the clusters. Accordingly, the disclosed techniques allow clusters to overlap and can disambiguate overlapping clusters as information about the data is learned in an unsupervised manner.

In some examples, the disclosed techniques can cluster any number of clustering features in the input data, including, for example, primary features and derived features. Primary features are portions of the input data that are directly sampled by a sensor and digitized by a receiver. Primary features are chosen because they generally separate clusters are therefore are good signal discriminators. Derived features are determined indirectly from the data by aggregating one or more features across samples. Derived features are not necessarily closely spaced within a cluster and therefore cannot always be encompassed within cluster boundaries like the primary features. Derived features are most effective when data exclusively associated with a given cluster is used. If a cluster is contaminated with incorrectly clustered data, then the derived features may be less accurate. The perceived error in the derived features is used to filter out samples that are not likely to belong to the corresponding cluster. In this way, derived features are used to supplement the primary feature clustering analysis.

Example Data Clustering System

Figure 1:
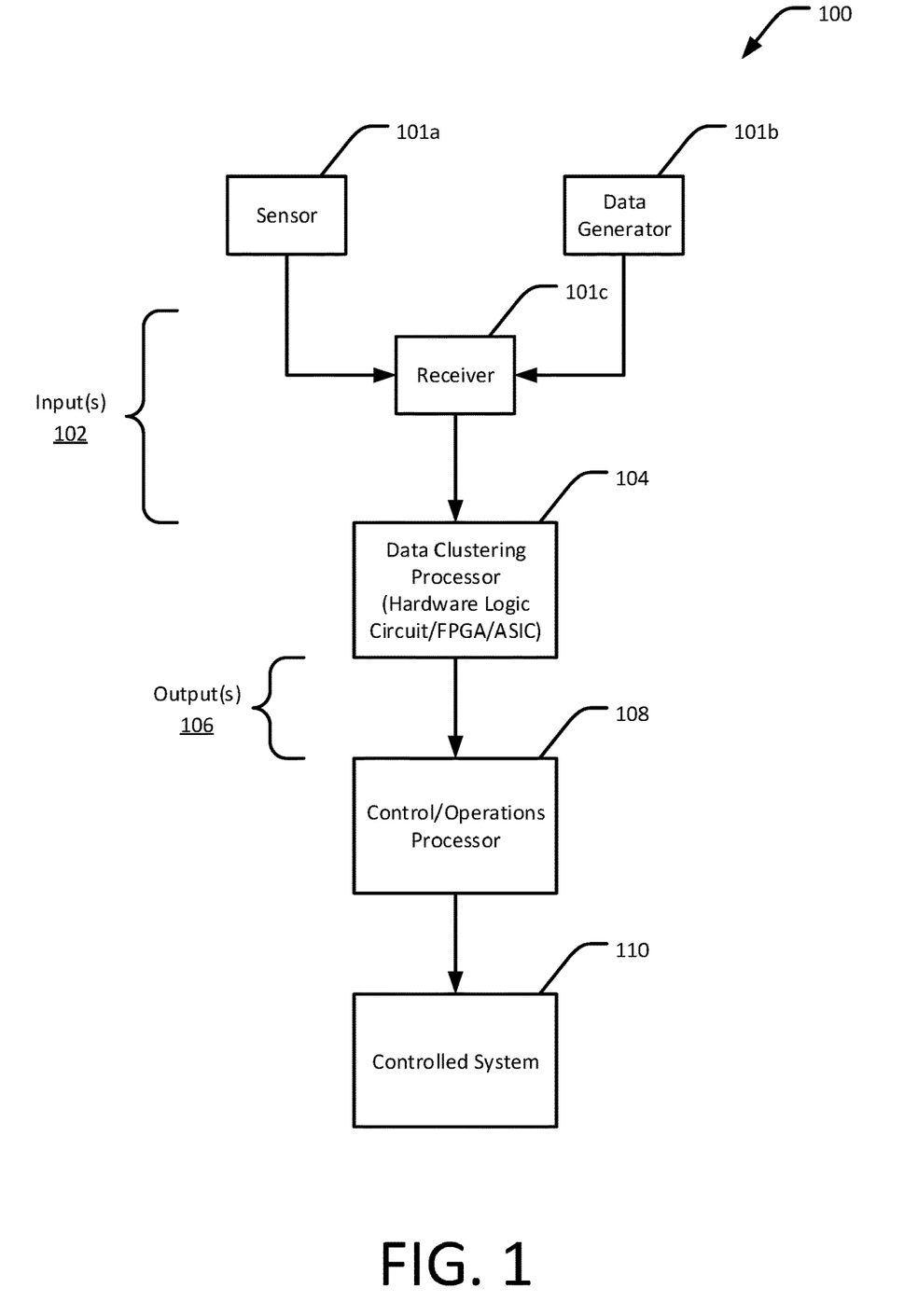
FIG. 1 is a block diagram of an example data clustering system, in accordance with an embodiment of the present disclosure.

FIG. 1 is a block diagram of an example data clustering system 100, in accordance with an embodiment of the present disclosure. The system 100 has one or more inputs 102, each of which is configured to provide a plurality of data points encoded in at least one signal, also referred to as a data stream. The data stream can be periodic, intermittent, or continuous. For example, the input 102 can be a data stream generated by a sensor 101a, or more generally any data generator 101b. A receiver 101c digitizes and/or translates the data stream into a form that is usable as one or more primary features by the data clustering processor 104 downstream. The system 100 further includes a data clustering processor 104, which includes a hardware logic circuit, such as an FPGA or an ASIC. The data clustering processor 104 is configured to cluster the data stream into one or more data clusters in real-time or in near real-time, and to encode at least one of the data clusters in at least one output signal 106. The data clustering processor 104 is further configured to update existing data clusters with new data in the data stream, to split, merge, or delete the data clusters based on the newly added data. The output signal 106 is provided to a control/operations processor 108 and/or a controlled system 110 for further processing. For example, the control/operations processor 108 and/or the controlled system 110 can include a machine, a vehicle, an aircraft, a vessel, a munition, or any other device that is configured to process or otherwise utilize the data clusters encoded in the output signal 106, as will be appreciated.

FIG. 2 is an example data clustering processor 104 for clustering data in real time or in near-real time, in accordance with an embodiment of the present disclosure. As noted above, the data processing cluster 104 can be implemented in a FPGA. The FPGA is an integrated circuit configurable using, for example, a hardware description language (HDL) or other circuit arrangement. The data clustering processor 104 is configured with one or more logic pipelines 200 (such as example pipeline 200a shown within the dashed box) to extract 202 one or more features of one or more data points from at least one input signal 102 (e.g., input signals 102(1), 102(2), . . . , 102(N)) via the receiver 101c. The data clustering processor 104 is further configured to create and/or update 204 one or more data clusters representing one or more of the data points. Further details about creating and updating data clusters is described below. The data clustering processor 104 is further configured to encode 206 at least one of the one or more data clusters in at least one output signal 106 (e.g., output signals 106(1), 106(2), . . . , 106(N)), which can be sent to the control/operations processor 108 or another downstream device for further processing. In some embodiments, such as the one shown in FIG. 6, the data clustering processor 104 is further configured to split and/or merge the data clusters based on a statistical distribution of the one or more data points in the respective data cluster. Further details about merging and splitting data clusters is described below. In some embodiments, multiple creating/updating and merging/splitting pipelines can exist in parallel within the data clustering processor 104. As a result, the creating/updating can occur in parallel for each data stream in the input signal 102, such as when the input signal 102 is encoded with multiple data streams or when there are multiple input signals 102 each having one or more encoded data streams. In operation, each of the one or more inputs 102 is received at a corresponding pipeline 200 and clocked through the pipeline. Note that each of inputs 102 can be, for instance, a distinct signal provided by receiver 101c, or portions of a single signal provided by receiver 101c. Clocking speed can vary from one embodiment to the next, and N can be any integer (e.g., 1, 2, 3, etc.). The faster the frequency of the clock, the faster the input 102 data is processed through the pipeline 200; in addition, the greater the number of pipelines 200 included in the pipeline structure, the greater the amount of input 102 data that can be processed per clock cycle. Numerous parallel logic processing schemes can be achieved by arranging multiple data processing blocks in a particular fashion, as will be appreciated in light of this disclosure.

Example Data Clustering Scenario

Figure 3:
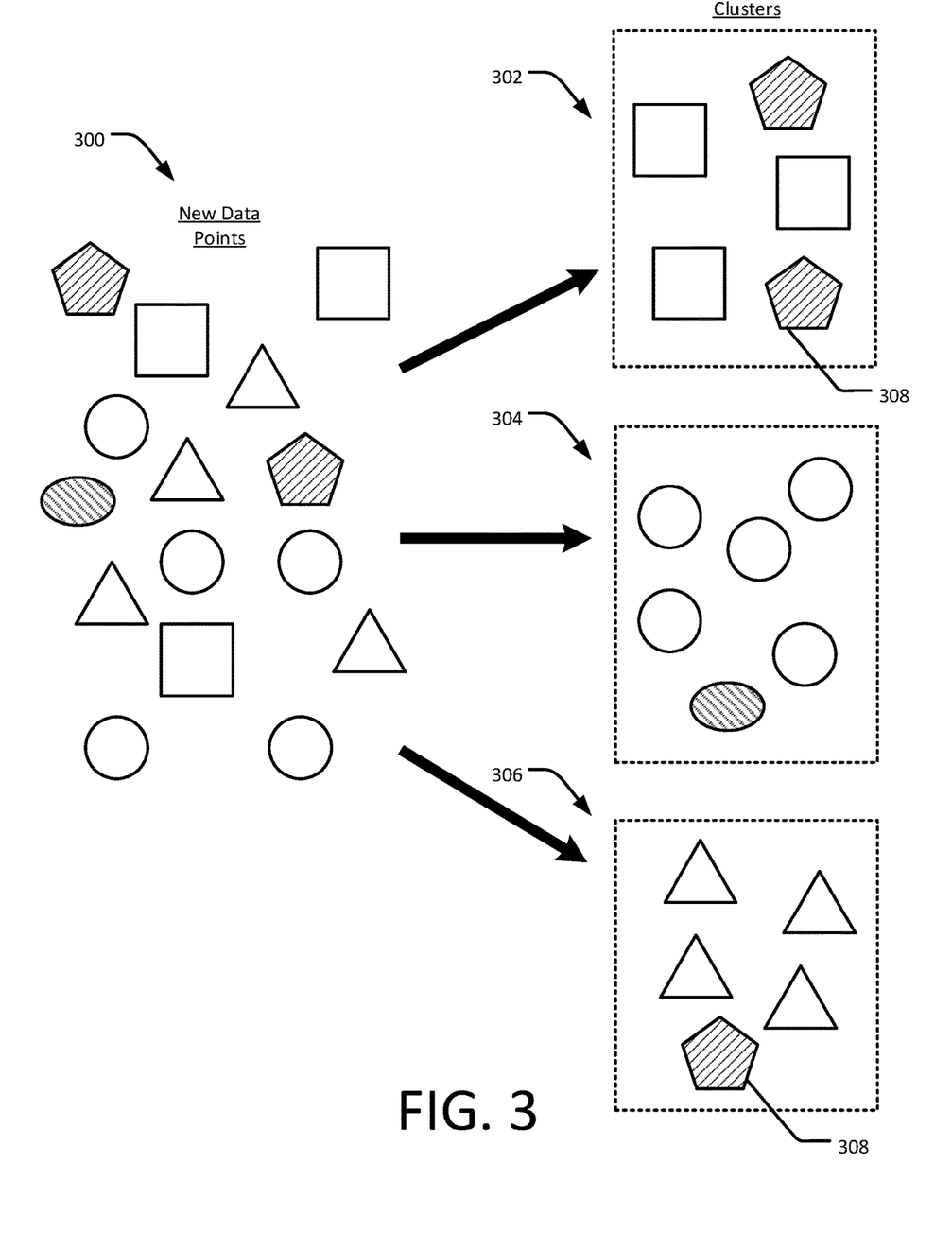
FIG. 3 is a schematic diagram showing an example set of new data points and several data clusters including the new data points, in accordance with an embodiment of the present disclosure.

FIG. 3 is a schematic diagram showing a set of new data points 300, represented by various shapes, and several data clusters 302, 304, 306 including the new data points 300, in accordance with an embodiment of the present disclosure. Each shape represents one or more clustering features within the set of new data points 300. The clustering features can include, for example, primary features and derived features. Primary features are portions of the input data that are directly sampled/measured by a sensor, receiver, or other device. Primary features are chosen because they generally separate clusters and are therefore are good signal discriminators. In RF or acoustic sensor embodiments, examples of primary features include amplitude, frequency, and direction. In optical or infrared sensor embodiments, examples of primary features may include color, intensity and x- and y-coordinates per pixel. Derived features are determined indirectly from the data by aggregating one or more features across samples. Derived features are not necessarily closely spaced within a cluster and therefore cannot always be encompassed within cluster boundaries like the primary features. In RF or acoustic embodiments, examples of primary features may include location, modulation and direction. In optical or infrared sensor embodiments, derived features may include edges, shapes and other filtered or thresholded products of the data.

As discussed in further detail below, the set of new data points 300 are clustered into one or more of the data clusters 302, 304, 306 according to their respective clustering features. Each of the data clusters 302, 304, 306 includes at least a portion of the set of new data points 300. In some cases, one or more of the new data points 300 can be included in more than one data cluster, such as the data point 308 in FIG. 3. In any event, as additional new data points 300 are received in the incoming data stream, those data points are either added to an existing data cluster or to a newly created data cluster, depending on the location of the respective clustering features with respect to the data points that are already within any existing data cluster(s). This process of adding new data points to data clusters causes the size of the data cluster to increase. In some cases, such data clusters can be split into two or more separate data clusters when a certain size is reached, where each of the separate data clusters is no larger than the original data cluster. In some other cases, separate data clusters having overlapping data can be merged together, such as discussed with respect to FIGS. 4 and 5.

Figure 4:
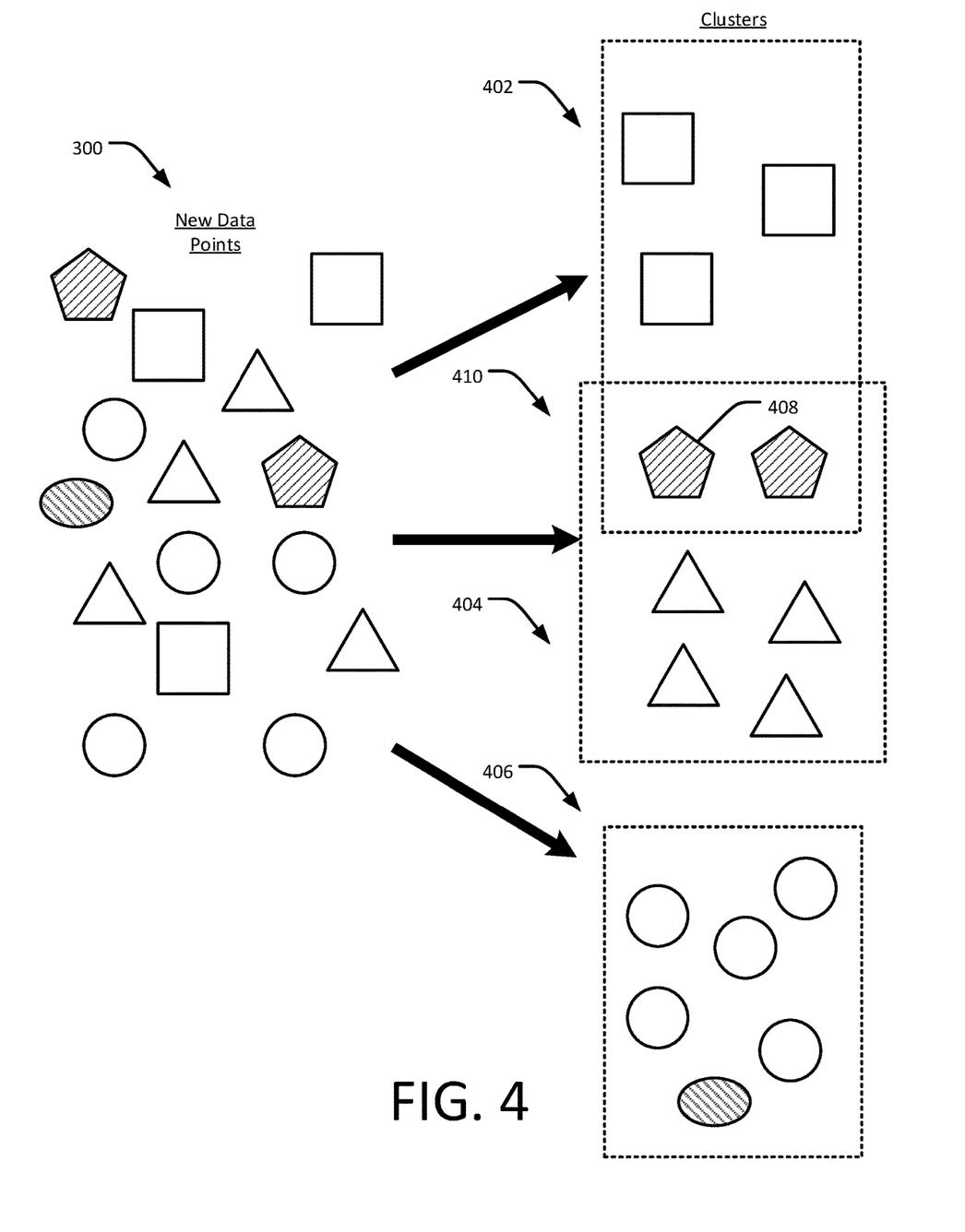
FIG. 4 is a schematic diagram showing the set of new data points and several other example data clusters including the new data points, in accordance with another embodiment of the present disclosure.

FIG. 4 is a schematic diagram showing the set of new data points 300, and several data clusters 402, 404, 406 including the new data points 300, in accordance with another embodiment of the present disclosure. As noted above, in some cases one or more of the new data points 300 can be included in more than one data cluster, such as the data point 408 in FIG. 4, which is included in data clusters 402 and 404. The data clusters 402, 404 with common data points are considered to overlap, such as indicated at 410. In such cases, the data clusters 402, 404 can be merged into one cluster when certain conditions are met with respect to the size and distribution of data points within each cluster, as discussed in further detail below.

Figure 5A:
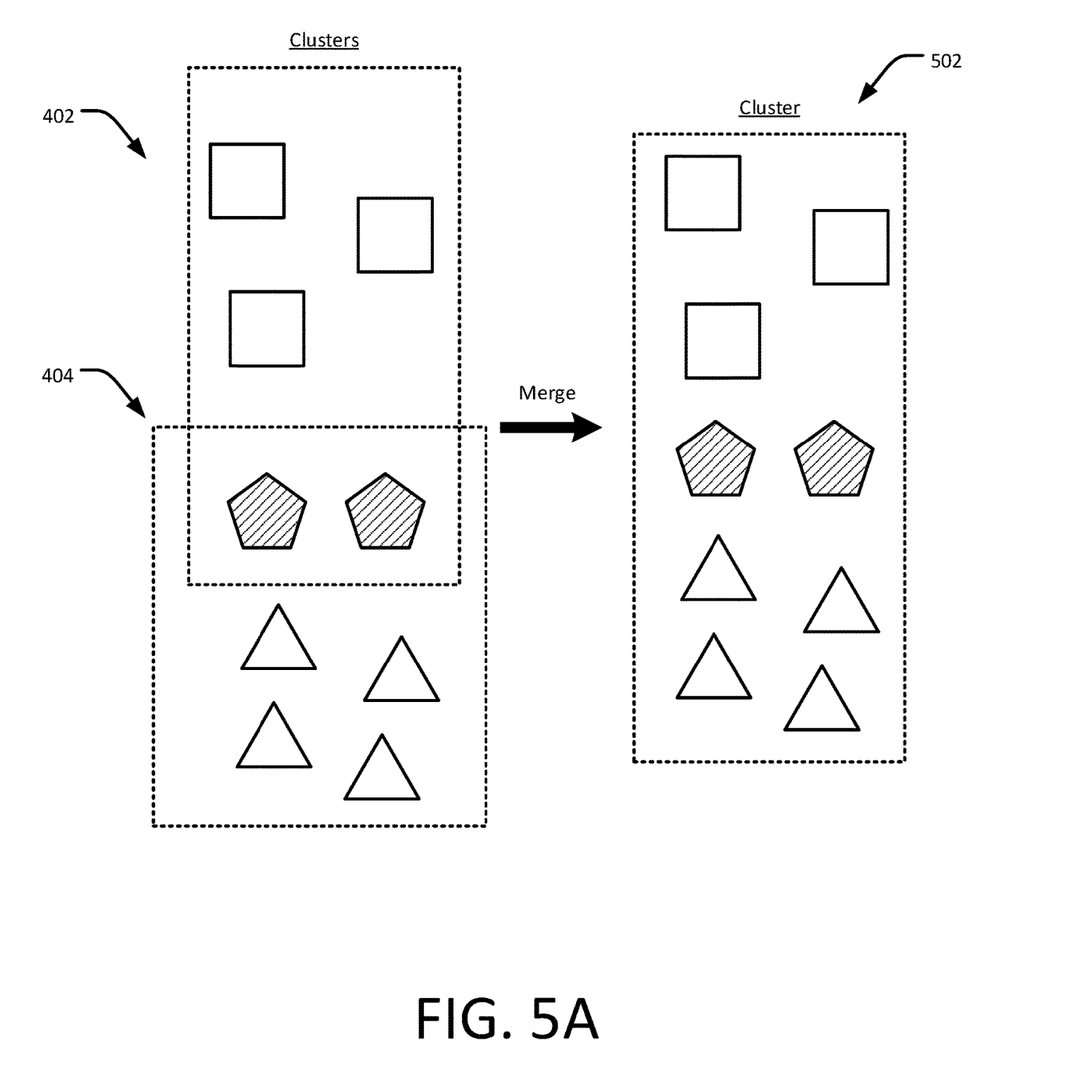
FIGS. 5A-B are schematic diagrams showing example data clusters prior to merger, an example of a newly merged data cluster including all of the data points from the separate data clusters, and examples of split data clusters including all of the data points from an original data cluster, in accordance with some embodiments of the present disclosure.
Figure 5B:
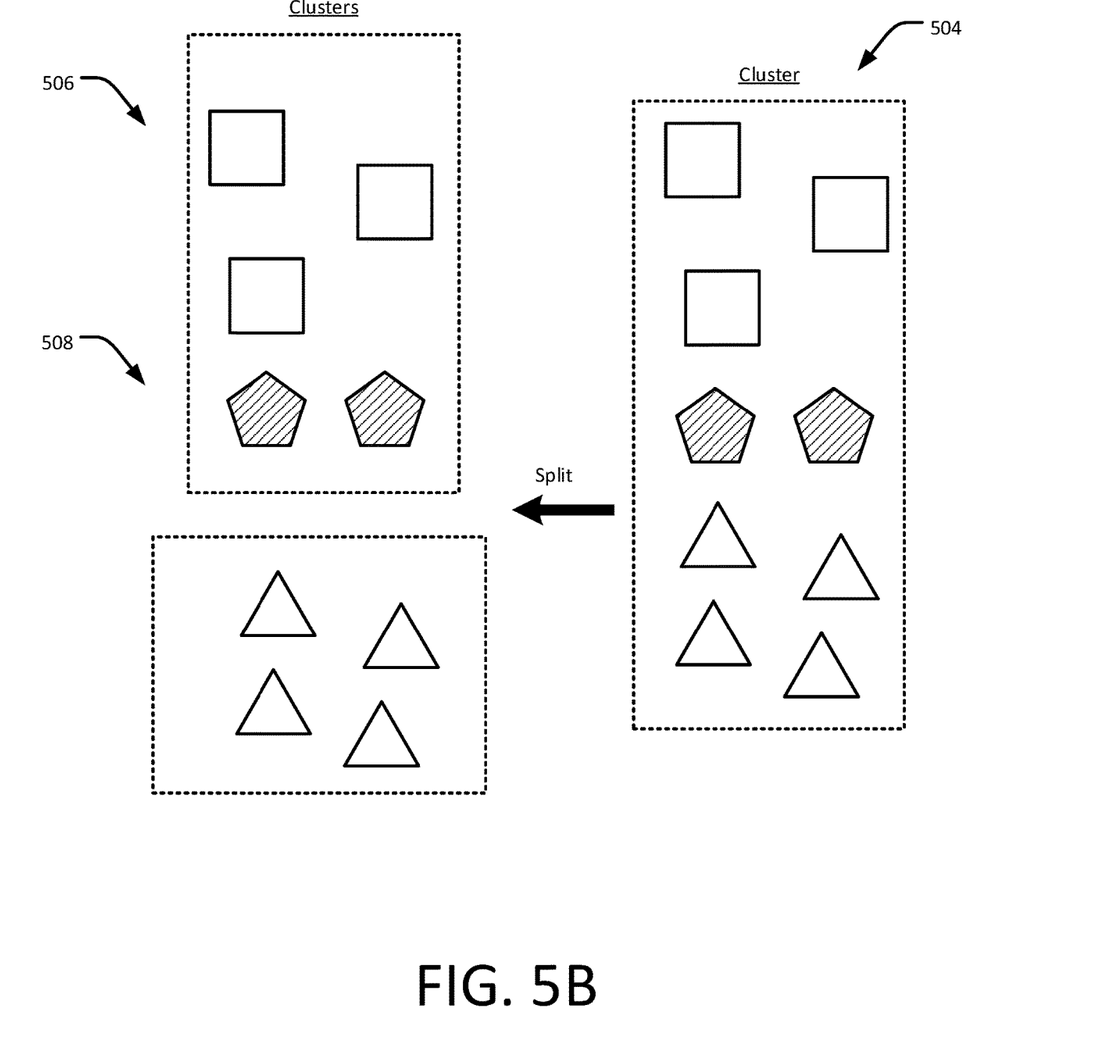

FIG. 5A is a schematic diagram showing the data clusters 402, 404 of FIG. 4 prior to merger, and a newly merged data cluster 502 including all of the data points from the data clusters 402, 404. The merged data cluster 502 replaces the separate data clusters 402, 404. FIG. 5B is a schematic diagram showing a data cluster 504, which can be split into two or more data clusters, such as the data clusters 506 and 508 with no overlapping data points.

Example Data Clustering Processor Pipelines

FIG. 6 is a flow diagram of an example data clustering processor logic pipeline 200b for clustering data, in accordance with an embodiment of the present disclosure. The pipeline 200b can be implemented in a FPGA, for example, by configuring the data clustering processor 104 of FIGS. 1 and 2 using HDL. As will be appreciated, the example pipeline 200b is similar to the pipeline 200 discussed with reference to FIG. 2, except that it includes logic to merge/split data cluster. The previous relevant discussion is equally applicable here. The pipeline 200b includes extracting 202 one or more features of one or more data points from at least one input signal 102. As noted above, the features can include primary features and derived features. The pipeline 200b further includes creating and/or updating 204, based on the one or more features, one or more data clusters representing one or more of the data points. Further details about creating and updating data clusters is described below. The pipeline 200b further includes encoding 206 at least one of the one or more data clusters in at least one output signal 106. In some embodiments, the pipeline 200b includes splitting and/or merging 608 the one or more data clusters based on a statistical distribution of the one or more data points in the respective data cluster. Further details about merging and splitting data clusters is described below. In some such example embodiments, the creating/updating 204 and the merging/splitting 608 can occur in parallel. Furthermore, the creating/updating 204 can occur in parallel for each data stream in the input signal 102, such as when the input signal 102 is encoded with multiple data streams or when there are multiple input signals 102 each having one or more encoded data streams.

Creating and Updating Clusters

In accordance with an embodiment, the data clustering processor 104 is configured to create clusters; match data points to the clusters; perform all infant cluster calculations; transition infant clusters into adult clusters; update the mean, standard deviation, scale value and histogram statistics as well as the locations and sizes of all clusters; flag overlapping clusters for merge attempts; and sort data into merged and split test clusters. At least some of these operations are performed on the data clustering processor 104 because they operate independently across clusters, have low complexity, and therefore are highly parallelizable. Note that in the case where new data points arrive at a high rate, these clustering operations would be prohibitive for software if data points are not to be dropped, whereas a data clustering processor 104 can operate fast enough to avoid dropping data points.

In accordance with some embodiments, two types of data clusters can be created and updated: infant clusters 754 and adult clusters 750. Infant clusters are created for any new input data points that do not match or otherwise belong to an existing cluster. An infant cluster can be converted to an adult cluster when it has received a predetermined number of data points; otherwise, an infant cluster is updated in the same way as any other cluster except that in some cases infant clusters are deleted if they do not achieve a certain size after a predetermined period of time or after a certain number of new data points are received. In any event, each infant and adult cluster is considered to be its own entity that can change in real-time independently of other clusters.

FIGS. 7A-B are flow diagrams of example data clustering processor logic pipelines 204a, 204b for creating or updating, and splitting or merging data clusters, respectively, in accordance with an embodiment of the present disclosure. At least portions of the pipelines 204a, 204b described below can be implemented, for example, by configuring the data clustering processor 104 of FIGS. 1 and 2 using HDL. Referring to FIG. 7A, the creating/updating pipeline 204a includes receiving 702 a new data point. The data point can be one of many within a stream of incoming data 700. The pipeline 204a further includes determining 704 whether the new data point matches one or more existing adult or infant clusters 750. If the new data point matches one or more existing clusters, then the pipeline 204a includes adding 706 the new data point to the matching cluster(s), which updates the existing cluster 750 in storage or memory 752. Otherwise, the pipeline 204a includes creating 708 an infant cluster 754 to contain the new data point in storage or memory 752.

As noted above, in some embodiments infant clusters 754 are created for any input data points that do not belong to an existing cluster 750. Infant clusters 754 have a default size in the primary clustering features. The default size can be, for example, a constant value that helps seed the cluster to allow it to grow. Infant clusters 754 update their location automatically as they receive new data and are centered about their mean data value within each primary clustering feature. Infant clusters 754 can only be grown with data that does not belong to any other cluster (they are not allowed to use overlapped data). Infant clusters 754 will timeout and be deleted if they do not receive any new data within a certain amount of time. This ensures that any infant clusters 754 resulting from data outliers are eventually deleted.

Referring to FIG. 7B, an infant cluster 754 becomes an adult cluster 756 when it has received a predetermined number of data points. The splitting/merging pipeline 204b includes determining 726 whether the size of the infant cluster 754 exceeds a predetermined threshold size. If so, the pipeline 204b includes setting 728 an adult flag. When the adult flag is set for the infant cluster 754, it is converted into an adult cluster 756. Once a cluster becomes an adult 756, it is allowed to grow or shrink its borders as new data points are added 706 to it (see FIG. 7A). As discussed in further detail below, adult clusters 756 can merge with other clusters or split into multiple smaller clusters. In some examples, a timeout period for deleting adult clusters 756 when no new data points are added is longer than for deleting infant clusters 754. Adult clusters 756 automatically move and grow their boundaries after every new point of data received. This is based on a statistical analysis of the data present within them. Adult clusters 756 are centered about their mean like infant clusters 754, but their boundaries are determined based on the standard deviation of the data and a scaling value, such as described in further detail below.

In some examples, the pipeline 204b can include several parallel processing paths 710, each of which can execute independently of the others. The pipeline 204b, including any or all of the parallel processing paths 710, can also execute independently of, and in parallel with, the pipeline 204a of FIG. 7A. One parallel processing path is used to set new cluster boundaries as the adult clusters 756 move and grow. The first part of this process is to calculate 712 the mean of the data for each primary feature using, for example, the following equation:

$$\mu_n = \mu_{n-1} + \frac{x_n - \mu_{n-1}}{\min(n, N_{win})}$$

where $x_n$ is the $n^{th}$ sample, $\mu_n$ is the $n^{th}$ iteratively calculated mean and $N_{win}$ is a window size after which the samples start rolling out of the statistics.

The second part of the process is to calculate 714 the standard deviation for each primary feature using, for example, the following equation:

$$\sigma_n^2 = \left(1 - \frac{1}{\min(n, N_{win})}\right)\left[\sigma_{n-1}^2 + (\mu_n - \mu_{n-1})^2\right] + \frac{(x_n - \mu_n)^2}{\min(n, N_{win})}$$

Note that the above two equations are exact for $n \leq N_{win}$ and approximate for greater values of n.

The third part of the process is to calculate 716 a scaling factor, or scale value, based on the statistical distribution of the data within the respective data cluster. The standard deviation alone is not always a good predictor of where the boundaries of each cluster should be, as the distribution of the data (e.g., normal, uniform, etc.) should be known. Uniformly distributed data will have a standard deviation closer to the edges of its data compared to a normal, or Gaussian, distribution, which approximates a bell curve. Therefore, uniformly distributed data requires a smaller scaling factor than a normal distribution. The following example algorithm can be used to calculate the scaling factor for any given distribution of data. Upon receiving a new point of data:

1) If (new data point value−mean of all data points in cluster) is within $\frac{1}{8}^{th}$ of a cluster boundary, then add X to counter A, else decrement counter A by 1.
2) If counter A exceeds value Y, then add $\frac{1}{8}^{th}$ to a scale value (2, 2.125, 2.25, . . . , 3.875) and reset counter A to Y/2.
3) If counter A reaches zero, then subtract $\frac{1}{8}^{th}$ from the scale value (2, 2.125, 2.25, . . . , 3.875) and reset counter A to Y/2.
4) Scale value has a minimum value of 2 and a maximum value of 3.875.

In this algorithm, X controls the weighting factor of the cluster boundary. For example, higher values of X will cause the scale value to react more significantly to data located at or near the cluster boundary. The value of Y controls how quickly the cluster can react to change, which affects the stability of the data points within the cluster. For example, higher values of Y help the cluster resist change (e.g., by addition of new data points) and thus be more stable. The values X and Y can vary depending on the application.

The final part of the process is to set 718 or apply the cluster boundaries in every primary feature. The boundaries determine the location of the cluster with respect to its features and the cluster size. For example, the upper and lower boundaries can be set as follows:

Upper cluster boundary=mean+standard deviation*scale value; and

Lower cluster boundary=mean−standard deviation*scale value.

Splitting and Merging Clusters

In some embodiments, adult clusters have the ability to merge together to form larger clusters. At least portions of the pipeline 204b described below can be implemented, for example, by configuring the data clustering processor 104 of FIGS. 1 and 2 using HDL. The pipeline for merging clusters is triggered or otherwise operates in response to a new data point falling within the boundaries of two different clusters, such as shown in FIGS. 4 and 5. This can occur, for example, after neighboring clusters grow enough such that their boundaries overlap.

Referring again to FIG. 7B, in another one of the parallel processing paths 710, the pipeline 204b includes determining 720 whether a given data point is placed in more than one cluster. If so, the pipeline 204b includes setting 722 a merge flag for the respective data clusters. When the merge flag is set, the merge process includes creating a test cluster that includes all of the stored data from each of the individual clusters that are candidates for merging. The test cluster is scored based on the derived features of the data. The scoring of each derived feature can be proportional to the probabilistic likelihood of the derived feature data given that they actually come from the same cluster. If the test cluster receives a higher score than either of the individual clusters, then the test cluster is converted to an adult cluster, effectively merging the individual clusters, the merge flag is reset, and the two original individual clusters are deleted. Using this pipeline, multiple smaller adult clusters can be combined into a larger one as long as the derived features show better results. If a pair of clusters fails to merge, then the test cluster is deleted, the merge flag is reset, and new merge attempts for the individual clusters are suspended until a pre-determined number of additional points are received to prevent an excessive number of successive, and potentially failed, merge attempts from occurring.

Adult clusters 756 also have the ability to split into smaller ones. The pipeline for splitting clusters is triggered or otherwise operates in response to the derived feature scoring for an adult cluster being too low or otherwise falling below a threshold value. Referring to FIG. 7B, another one of the parallel processing paths 710 includes updating 724 a histogram with each new data point as it arrives. The first step in the split process is to analyze the histogram data for each of the primary features. The maximum histogram bin, and adjacent bins with counts higher than a minimum threshold, are grouped together, and if the total count in this potential split cluster contains more than some fraction of the total count but less than the total count, then two test clusters are created and the data is sorted into them. The first test cluster includes only data found in the histogram peak bins and the second test cluster includes all of the other data. Derived feature scoring of the data is performed on each individual test cluster. If either test cluster scores higher than the original cluster, then both of the test clusters are promoted to adult clusters and the original is deleted. If neither test cluster scores higher than the original cluster, then the test clusters are deleted, and new split attempts are suspended until a certain number of additional points are received. After performing a split, the derived features are used as a discriminator for future data to help maintain the separate clusters.

In some embodiments, software can be used to calculate the scores of merged and split test clusters. The likelihood-based scoring calculation is relatively complex and relatively infrequently executed, therefore it is well-suited for implementation in software, for example on an embedded controller or an external microcontroller, although it will be appreciated that in some examples the scoring calculation can be implemented in the firmware of the FPGA. The software can further be configured to delete adult clusters that have not received any data points for a long period of time. Cluster deletion is a long-term operation and therefore is well-suited for implementation in software; however, it will be appreciated that the cluster deletion calculation can be implemented in the firmware of the FPGA. In some embodiments, software can also inhibit merging, splitting or updating of adult clusters if their primary and/or derived feature bounds fall within certain ranges that have been pre-tabulated in storage 208. This logic effectively freezes clusters that meet the parameters of certain known signal types. This semi-supervised approach is slightly less general than fully unsupervised clustering but increases performance accuracy on signals of interest in the presence of extraneous neighboring or overlapping signals and also frees up clustering resources.

Figure 8:
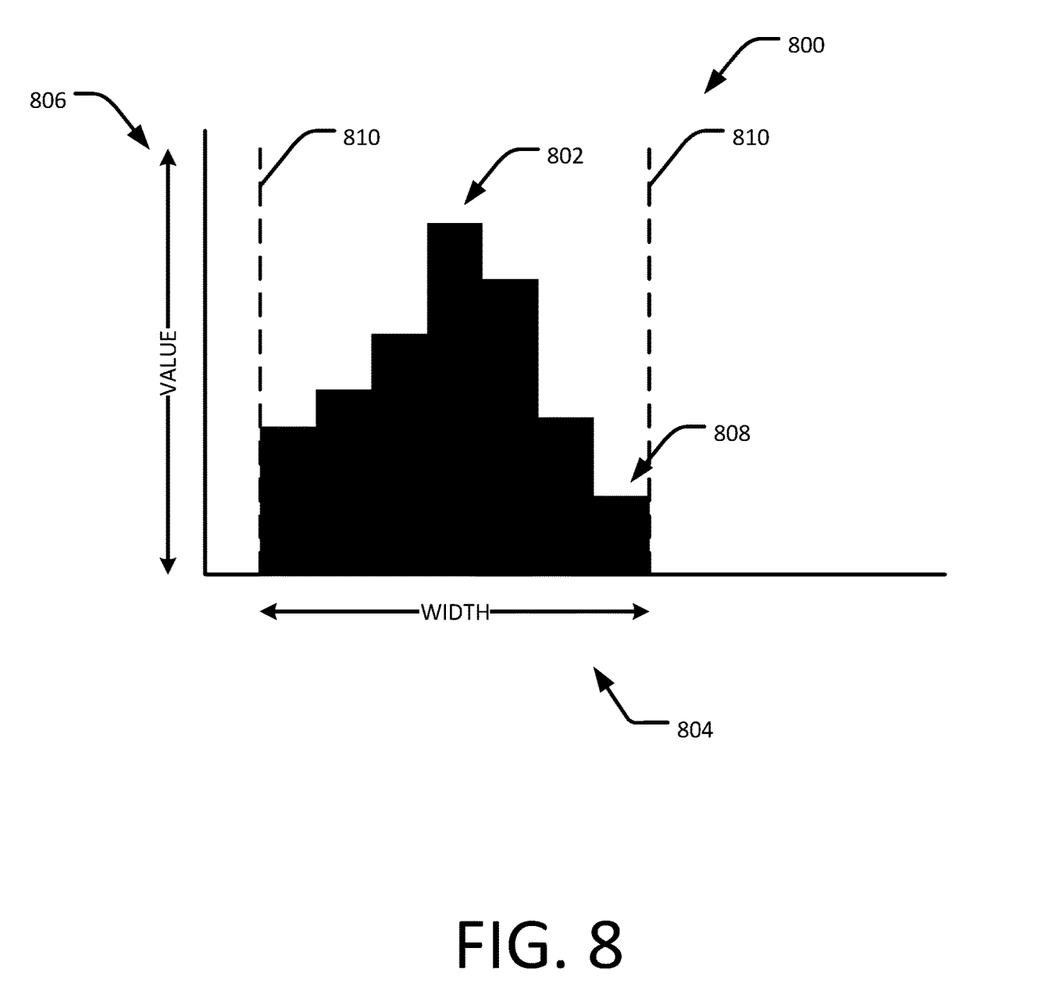
FIG. 8 shows an example histogram of a data cluster, in accordance with an embodiment of the present disclosure.

As previously mentioned, each feature of each cluster has a histogram associated with it. The histogram calculated by the data clustering processor 104 is stored in the storage 208 or other memory. FIG. 8 shows an example histogram 800, in accordance with an embodiment. The histogram is centered about the first data point 802 that creates the cluster, or if the cluster is software created (merges and splits) then the histogram is centered about the middle of the boundaries for that feature. The width 804 and depth (out of the depicted plane) of the histogram in three-dimensions are predetermined constants, and memory for the histogram is pre-allocated with the address of the memory representing the bin number of the histogram. In some cases, the data may be shifted right (e.g., by dropping the bottom lowest significant bits) to increase the size of each individual bin so that less bins and memory can be used to cover the same range. As each new point of data is added to a cluster, the histogram bin 808 is determined for each feature. The bin is calculated by subtracting the new data point value from the value of the histogram center 802. The result is the bin number and also the address in memory. Saturation is performed after this subtraction if the result exceeds the histogram boundaries 810 (that is, the result is set equal to a boundary of the data cluster). Once the bin number is determined, the bin value is read from memory, incremented, and then written back to memory.

Next, a check is performed to determine if the new bin value 808 exceeds a threshold. The threshold can be set close to the bin's maximum depth, which is determined by the available memory. If the new bin value exceeds threshold, then a halving cycle will be performed. The halving cycle goes through the entire histogram for that feature and reduces all histogram values by half. This allows the relational bin information (bin values relative to other bin values) to be maintained, while allowing the histogram to grow indefinitely within the confines of available memory. During histogram halving cycles, new data points associated with that histogram are ignored. A semaphore can be used to prevent a histogram halving cycle while software is reading the histogram, and another semaphore can be used to prevent software from reading the histogram while it is in the middle of a halving cycle.

Additional Examples

Numerous embodiments will be apparent in light of the present disclosure, and features described herein can be combined in any number of configurations.

Example 1 provides a data clustering device, including an input configured to receive a plurality of data points encoded in at least one signal and a hardware logic circuit. The hardware logic circuit is configured to extract one or more features of the one or more data points from the at least one signal; create or update, based on the one or more features and in a first processing path, one or more first data clusters representing one or more of the data points; split or merge, in a second processing path that executes in parallel with the first parallel processing path, one or more second data clusters based on a statistical distribution of the one or more data points in the respective second data cluster; and encode at least one of the one or more first or second data clusters in at least one output signal. The device further includes an output configured to provide the at least one output signal to a processor.

Example 2 includes the subject matter of Example 1, where the hardware logic circuit is further configured to split or merge the one or more data clusters based on a statistical distribution of the one or more data points in the respective data cluster.

Example 3 includes the subject matter of any of Examples 1 and 2, where the hardware logic circuit is further configured to calculate, for each of the one or more first or second data clusters, a boundary based on i) a mean value of the one or more data points in the respective first or second data cluster, ii) a standard deviation for each of the one or more features of the one or more data points in the respective first or second data cluster, and iii) a scaling factor based on a statistical distribution of the one or more data points in the respective first or second data cluster, and where each of the one or more first or second data clusters are created or updated based on a location of the one or more features with respect to the boundary.

Example 4 includes the subject matter of Example 3, where a given one of the one or more first data clusters is newly created to include the respective one or more data points when the location of the one or more features is not within the boundary of an existing data cluster, otherwise the existing data cluster is updated to include the respective one or more data points.

Example 5 includes the subject matter of any of Examples 3 and 4, where the hardware logic circuit is further configured to calculate the scaling factor by adding or subtracting a constant value to or from the scaling factor based on a distance between the boundary and the one or more data points less the mean value of the one or more data points in the respective first or second data cluster, and where the boundary is the scaling factor multiplied by a combination of, or a difference between, the mean value and the standard deviation.

Example 6 includes the subject matter of any of Examples 1-5, where the hardware logic circuit is a field programmable gate array (FPGA) or an application-specific integrated circuit (ASIC), and where the hardware logic is further configured to create or update the one or more of the first data clusters in parallel to splitting or merging the one or more of the second data clusters using processes encoded in Hardware Description Language (HDL) or in a logic circuit.

Example 7 includes the subject matter of any of Examples 1-6, where the input is coupled to at least one of a sensor, a receiver, and a data generator.

Example 8 provides a data clustering pipeline, including receiving a plurality of data points encoded in at least one signal; extracting one or more features of the one or more data points from the at least one signal; creating or updating, in a first processing path of a hardware logic circuit and based on the one or more features, one or more first data clusters representing one or more of the data points; encoding at least one of the one or more first or second data clusters in at least one output signal; and providing the at least one output signal to a processor.

Example 9 includes the subject matter of Example 8, further including splitting or merging, by the hardware logic circuit, the one or more data clusters based on a statistical distribution of the one or more data points in the respective data cluster.

Example 10 includes the subject matter of any of Examples 8 and 9, further including calculating, for each of the one or more first or second data clusters, a boundary based on i) a mean value of the one or more data points in the respective first or second data cluster, ii) a standard deviation for each of the one or more features of the one or more data points in the respective first or second data cluster, and iii) a scaling factor based on a statistical distribution of the one or more data points in the respective first or second data cluster, where each of the one or more first or second data clusters are created or updated based on a location of the one or more features with respect to the boundary.

Example 11 includes the subject matter of Example 10, where a given one of the one or more first data clusters is newly created to include the respective one or more data points when the location of the one or more features is not within the boundary of an existing data cluster, otherwise the existing data cluster is updated to include the respective one or more data points.

Example 12 includes the subject matter of any of Examples 10 and 11, further including calculating the scaling factor by adding or subtracting a constant value to or from the scaling factor based on a distance between the boundary and the one or more data points less the mean value of the one or more data points in the respective first or second data cluster, where the boundary is the scaling factor multiplied by a combination of, or a difference between, the mean value and the standard deviation.

Example 13 includes the subject matter of any of Examples 8-12, further including creating or updating the one or more first data clusters in parallel to splitting or merging the one or more second data clusters by executing parallel processes by the hardware logic circuit and/or at least one processor.

Example 14 includes the subject matter of any of Examples 8-13, further including receiving the at least one signal from at least one of a sensor, a receiver, and a data generator.

Example 15 provides a data clustering device, including a storage and at least one processor or programmable logic device operatively coupled to the storage and configured to extract one or more features of one or more data points from at least one input signal; create or update, in the storage and based on the one or more features, one or more data clusters representing one or more of the data points based on a location of the one or more features with respect to a boundary by calculating, for each of the one or more data clusters, the boundary based on i) a mean value of the one or more data points in the respective data cluster, ii) a standard deviation for each of the one or more features of the one or more data points in the respective data cluster, and iii) a scaling factor based on a statistical distribution of the one or more data points in the respective data cluster; and encode at least one of the one or more data clusters in at least one output signal.

Example 16 includes the subject matter of, where the at least one processor or programmable logic device is further configured to split or merge the one or more data clusters in the storage based on a statistical distribution of the one or more data points in the respective data cluster.

Example 17 includes the subject matter of any of Examples 15 and 16, where a given one of the one or more data clusters is newly created to include the respective one or more data points when the location of the one or more features is not within the boundary of an existing data cluster, otherwise the existing data cluster is updated to include the respective one or more data points.

Example 18 includes the subject matter of any of Examples 15-17, where the at least one processor or programmable logic device is further configured to calculate the scaling factor by adding or subtracting a constant value to or from the scaling factor based on a distance between the boundary and the one or more data points less the mean value of the one or more data points in the respective data cluster, and where the boundary is the scaling factor multiplied by a combination of, or a difference between, the mean value and the standard deviation.

Example 19 includes the subject matter of any of Examples 15-18, where the at least one processor or programmable logic device is further configured to split or merge the one or more data clusters in parallel to creating or updating the one or more data clusters.

Example 20 includes the subject matter of any of Examples 15-19, where the input is coupled to at least one of a sensor, a receiver, and a data generator.

The foregoing description and drawings of various embodiments are presented by way of example only. These examples are not intended to be exhaustive or to limit the present disclosure to the precise forms disclosed. Alterations, modifications, and variations will be apparent in light of this disclosure and are intended to be within the scope of the present disclosure as set forth in the claims.

What is claimed is:

1. A data clustering device, comprising:
   an input configured to receive a data stream comprised of a plurality of data points encoded in at least one signal;
   a hardware logic circuit configured to
      extract one or more features of the one or more data points from the at least one signal;
      create or update, based on the one or more features and in a first processing path, one or more first data clusters representing one or more of the data points;
      split or merge, in a second processing path that executes in parallel with the first processing path, one or more second data clusters based on a statistical distribution of the one or more data points in the respective second data cluster; and
      encode at least one of the one or more first or second data clusters in at least one output signal;
      calculate, for each of the one or more first or second data clusters, a boundary based on i) a mean value of the one or more data points in the respective first or second data cluster, ii) a standard deviation for each of the one or more features of the one or more data points in the respective first or second data cluster, and iii) a scaling factor based on a statistical distribution of the one or more data points in the respective first or second data cluster, and wherein each of the one or more first or second data clusters are created or updated based on a location of the one or more features with respect to the boundary and wherein a given one of the one or more first data clusters is newly created to include the respective one or more data points when the location of the one or more features is not within the boundary of an existing data cluster, otherwise the existing data cluster is updated to include the respective one or more data points; and
   an output configured to provide the at least one output signal.

2. The device of claim 1, wherein the hardware logic circuit is further configured to split or merge the one or more data clusters based on a statistical distribution of the one or more data points in the respective data cluster.

3. The device of claim 1, wherein the hardware logic circuit is further configured to add or subtract a constant value to or from the scaling factor based on a distance between the boundary and the one or more data points less the mean value of the one or more data points in the respective first or second data cluster, and wherein the boundary is the scaling factor multiplied by a combination of, or a difference between, the mean value and the standard deviation.

4. The device of claim 1, wherein the hardware logic circuit is a field programmable gate array (FPGA) or an application-specific integrated circuit (ASIC) configured to create or update the one or more of the first data clusters in parallel to splitting or merging the one or more of the second data clusters using processes encoded in Hardware Description Language (HDL) or in a logic circuit.

5. The device of claim 1, wherein the input is coupled to a sensor, a receiver, or a data generator.

6. A data clustering method, comprising:
   receiving a plurality of data points encoded in at least one signal;
   extracting one or more features of the one or more data points from the at least one signal;
   creating or updating, in a first processing path of a hardware logic circuit and based on the one or more features, one or more first data clusters representing one or more of the data points;
   splitting or merging, a second processing path of the hardware logic circuit executing in parallel with the first processing path, one or more second data clusters based on a statistical distribution of the one or more data points in the respective data cluster;
   encoding at least one of the one or more first or second data clusters in at least one output signal;
   calculating, for each of the one or more first or second data clusters, a boundary based on i) a mean value of the one or more data points in the respective first or second data cluster, ii) a standard deviation for each of the one or more features of the one or more data points in the respective first or second data cluster, and iii) a scaling factor based on a statistical distribution of the one or more data points in the respective first or second data cluster, and wherein each of the one or more first or second data clusters are created or updated based on a location of the one or more features with respect to the boundary and wherein a given one of the one or more first data clusters is newly created to include the respective one or more data points when the location of the one or more features is not within the boundary of an existing data cluster, otherwise the existing data cluster is updated to include the respective one or more data points; and
   providing the at least one output signal to a processor.

7. The method of claim 6, further comprising splitting or merging, by the hardware logic circuit, the one or more data clusters based on a statistical distribution of the one or more data points in the respective data cluster.

8. The method of claim 6, further comprising calculating the scaling factor by adding or subtracting a constant value to or from the scaling factor based on a distance between the boundary and the one or more data points less the mean value of the one or more data points in the respective first or second data cluster, wherein the boundary is the scaling factor multiplied by a combination of, or a difference between, the mean value and the standard deviation.

9. The method of claim 6, comprising creating or updating the one or more first data clusters in parallel to splitting or merging the one or more second data clusters by executing parallel processes by the hardware logic circuit.

10. The method of claim 9, wherein the hardware logic circuit comprises at least one processor.

11. The method of claim 6, further comprising receiving the at least one signal from a sensor, a receiver, or a data generator.

12. A data clustering device, comprising:
   a storage; and
   at least one processor or programmable logic device operatively coupled to the storage and configured to
      extract one or more features of one or more data points from at least one input signal;
      create or update, in the storage and based on the one or more features, one or more data clusters representing one or more of the data points based on a location of the one or more features with respect to a boundary by
         calculating, for each of the one or more data clusters, the boundary based on i) a mean value of the one or more data points in the respective data cluster, ii) a standard deviation for each of the one or more features of the one or more data points in the respective data cluster, and iii) a scaling factor based on a statistical distribution of the one or more data points in the respective data cluster, wherein a given one of the one or more data clusters is newly created to include the respective one or more data points when the location of the one or more features is not within the boundary of an existing data cluster, otherwise the existing data cluster is updated to include the respective one or more data points; and
      encode at least one of the one or more data clusters in at least one output signal.

13. The device of claim 12, wherein the at least one processor or programmable logic device is further configured to split or merge the one or more data clusters in the storage based on a statistical distribution of the one or more data points in the respective data cluster.

14. The device of claim 12, wherein the at least one processor or programmable logic device is further configured to calculate the scaling factor by adding or subtracting a constant value to or from the scaling factor based on a distance between the boundary and the one or more data points less the mean value of the one or more data points in the respective data cluster, and wherein the boundary is the scaling factor multiplied by a combination of, or a difference between, the mean value and the standard deviation.

15. The device of claim 12, wherein the at least one processor or programmable logic device is configured to split or merge the one or more data clusters in parallel to creating or updating the one or more data clusters.

16. The device of claim 12, wherein the input is coupled to a sensor, a receiver, or a data generator.

* * * * *